US010961889B2

(12) United States Patent
Hoehne et al.

(10) Patent No.: US 10,961,889 B2
(45) Date of Patent: Mar. 30, 2021

(54) METHODS AND SYSTEMS FOR REMOVING DEPOSITS IN AN AFTERTREATMENT SYSTEM

(71) Applicant: Cummins Inc., Columbus, IN (US)

(72) Inventors: John L. Hoehne, Columbus, IN (US); Paul Daniel Borisuk, Nashville, IN (US); Boopathi Singalandapuram Mahadevan, Columbus, IN (US); Joshua A. Lantz, North Vernon, IN (US); Jeffrey W. Lewis, Brownstown, IN (US); Snita Navnith Menon, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/320,844

(22) PCT Filed: Jul. 27, 2017

(86) PCT No.: PCT/US2017/044181
§ 371 (c)(1),
(2) Date: Jan. 25, 2019

(87) PCT Pub. No.: WO2018/022887
PCT Pub. Date: Feb. 1, 2018

(65) Prior Publication Data
US 2019/0162096 A1 May 30, 2019

Related U.S. Application Data

(60) Provisional application No. 62/368,682, filed on Jul. 29, 2016.

(51) Int. Cl.
*F01N 3/20* (2006.01)
*F01N 3/00* (2006.01)

(52) U.S. Cl.
CPC ............. *F01N 3/2066* (2013.01); *F01N 3/00* (2013.01); *F01N 2260/04* (2013.01);
(Continued)

(58) Field of Classification Search
CPC combination set(s) only.
See application file for complete search history.

(56) References Cited

U.S. PATENT DOCUMENTS 8,171,724 B2   5/2012   Xu et al.
8,281,578 B2 * 10/2012   Upadhyay ............... F01N 3/208
                                                          60/274

(Continued)

FOREIGN PATENT DOCUMENTS

EP       2 037 091      3/2009
EP       2 500 537      9/2012
WO   WO-2014/012096 A1  1/2014

OTHER PUBLICATIONS

International Search Report and Written Opinion for International Application No. PCT/US2017/044181, dated Oct. 6, 2017, 7 pages.

*Primary Examiner* — Binh Q Tran
(74) *Attorney, Agent, or Firm* — Foley & Lardner LLP

(57) ABSTRACT

Systems and methods for removing deposit in an aftertreatment system for an engine are disclosed herein. The method comprises determining an amount of deposits accumulated in the aftertreatment system, determining combustion targets for the engine in response to determining the amount of deposits exceeds a deposit threshold, and modulating an air mass flow for the engine based on the determined combustion targets. The air mass flow can be modulated by changing the position of the wastegate or the geometry of the variable geometry turbine (VGT).

23 Claims, 11 Drawing Sheets

(52) U.S. Cl.
CPC ...... *F01N 2610/00* (2013.01); *F01N 2610/01* (2013.01); *F01N 2610/03* (2013.01); *Y02A 50/20* (2018.01); *Y02T 10/12* (2013.01)

(56) References Cited

U.S. PATENT DOCUMENTS

| | | | |
|---|---|---|---|
| 8,621,845 B2 * | 1/2014 | Gonze | F01N 3/103 60/282 |
| 9,188,071 B2 * | 11/2015 | Sun | F01N 3/2066 |
| 9,212,587 B2 | 12/2015 | Light-Holets et al. | |
| 9,212,614 B2 | 12/2015 | Ancimer et al. | |
| 9,255,508 B2 * | 2/2016 | Yacoub | F02B 37/162 |
| 2005/0198945 A1 | 9/2005 | Okugawa et al. | |
| 2007/0119128 A1 | 5/2007 | Tochikawa et al. | |
| 2011/0005209 A1 * | 1/2011 | Gady | F01N 13/009 60/295 |
| 2013/0028792 A1 | 1/2013 | Yano et al. | |
| 2013/0340412 A1 * | 12/2013 | Ichikawa | F01N 3/208 60/286 |
| 2015/0059317 A1 | 3/2015 | Mital et al. | |
| 2016/0186630 A1 | 6/2016 | Osburn et al. | |

* cited by examiner

METHODS AND SYSTEMS FOR REMOVING DEPOSITS IN AN AFTERTREATMENT SYSTEM

CROSS-REFERENCE TO RELATED APPLICATION

This application claims the benefit of U.S. Provisional Patent Application No. 62/368,682, filed Jul. 29, 2016, entitled "METHODS AND SYSTEMS FOR REMOVING DEPOSITS IN AN AFTERTREATMENT SYSTEM," which is incorporated herein by reference in its entirety.

TECHNICAL FIELD

The present disclosure relates generally to cleaning aftertreatment systems of internal combustion engines.

BACKGROUND

Aftertreatment systems are widely used in internal combustion engine applications for the aftertreatment of engine exhaust gas to meet emissions regulations. For example, diesel oxidation catalysts (DOC), selective catalytic reduction (SCR) devices, and diesel particulate filters (DPF) have been used for handling and/or removing regulated pollutants, such as carbon monoxide, nitrogen oxide ($NO_x$), unburned hydrocarbons, sulfur, and soot in the exhaust gas of an engine. SCR devices may be subject to deterioration in performance resulting from deposits such as urea accumulated on the SCR catalyst. Some aftertreatment systems include, for example, active particulate filter regeneration, that can serve in part as a regeneration event for the SCR devices and other devices to remove urea deposit. However, certain aftertreatment systems do not include a particulate filter that requires periodic regeneration. To improve the efficiency of SCR devices, it is desirable to remove deposit accumulated on the SCR devices.

SUMMARY

An embodiment relates to an apparatus for removing deposits in an aftertreatment system for an engine. The apparatus comprises a deposit determination circuit structured to determine an amount of deposits accumulated in the aftertreatment system, a combustion targets determination circuit structured to determine combustion targets for the engine in response to determining the amount of deposits exceeds a deposit threshold, and a modulation circuit structured to modulate an air mass flow for the engine based on the determined combustion targets.

Another embodiment relates to method for removing deposits in an aftertreatment system for an engine. The method comprises determining an amount of deposits accumulated in the aftertreatment system, determining combustion targets for the engine in response to determining the amount of deposits exceeds a deposit threshold, and modulating an air mass flow for the engine based on the determined combustion targets.

Yet another embodiment relates to a system comprising a controller. The controller is structured to determine an amount of deposits accumulated in the aftertreatment system, determine combustion targets for the engine in response to determining the amount of deposits exceeds a deposit threshold, and modulate an air mass flow for the engine based on the determined combustion targets.

These and other features, together with the organization and manner of operation thereof, will become apparent from the following detailed description when taken in conjunction with the accompanying drawings.

DETAILED DESCRIPTION

Figure 1:
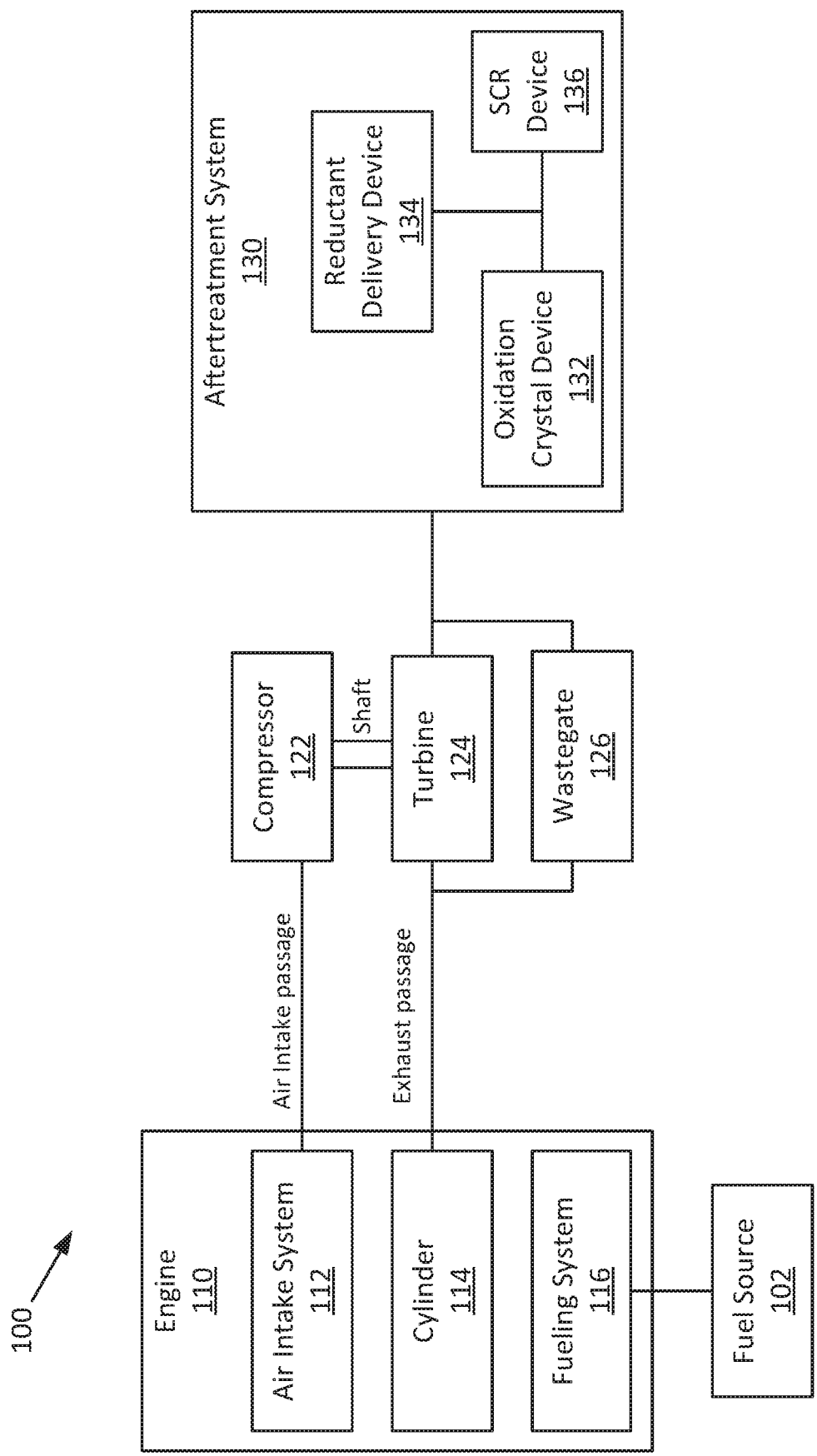
FIG. 1 is a schematic block diagram of an internal combustion engine application system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, various embodiments disclosed herein relate to systems, methods, and apparatuses for removing deposits in an aftertreatment system for an engine. Aftertreatment systems are used in internal combustion engine applications for the aftertreatment of engine exhaust gas to meet emissions regulations. Selective catalytic reduction (SCR) devices, for example, can be used in aftertreatment systems for reducing nitrogen oxides ($NO_x$) from the exhaust gas. During engine operation, an SCR device may adsorb or accumulate various contaminations in the exhaust stream (e.g., hydrocarbon) and/or the reductant (e.g., urea) used to reduce $NO_x$. Deposits of contaminants on the SCR device may reduce the contact area of the reaction catalyst and the exhaust gas, thus causing deterioration in the SCR device performance. In the method disclosed herein for removing the deposits, the amount of deposits accumulated in the aftertreatment system is determined based on, for example, the flow rate of exhaust gas flowing through the aftertreatment system, the temperature of the aftertreatment system, the dosing quantity of the reductant used to reduce $NO_x$, the run time of the engine since the last deposits removal event, and/or in another manner. When the amount of deposits exceeds a deposit threshold, combustion targets are determined for the engine. For example, the temperature of the aftertreatment system may need to be raised to certain range in order to effectively oxidize the deposits. Meanwhile, the smoke emission level may need to be kept below the level provided by emissions regulations. Other combustion targets may include the $NO_x$ emission level, the total hydrocarbon (THC) emission level, the air/fuel ratio, the brake specific fuel consumption (BSFC), the turbine inlet temperature (TIT), etc., that may need to be optimized and/or controlled. Then the air mass flow of the engine is modulated based upon the determined combustion targets. The air mass flow can be modulated by adjusting the wastegate position or the geometry of the variable geometry turbine (VGT).

Referring now to FIG. 1, a schematic block diagram of an internal combustion engine application system 100 is shown according to an example embodiment. The system 100 can be used in either mobile applications such as with a vehicle or stationary applications such as a power generation system. In the system 100, an engine 110 is charged with air flow by a compressor 122. The air flow mixes with fuel supplied from a fuel source 102. Combustion takes place in the engine 110. Exhaust gas of the combustion is discharged to a turbine 124, which is mechanically coupled to the compressor 122 and drives the compressor 122. A wastegate 126 can enable part of the exhaust gas to bypass the turbine 124, resulting in less power transfer to the compressor 122. A combination of bypass and turbine flow enters an aftertreatment system 130 for aftertreatment before releasing to the atmosphere.

The engine 110 may be any internal combustion engine (e.g., compression-ignition, spark-ignition) powered by any fuel type (e.g., diesel, ethanol, gasoline, etc.). The engine 110 may be a four-stroke (i.e., intake, compression, power, and exhaust) engine. An example of diesel engine is shown in FIG. 1 for illustration only and not for limitation. The engine 110 includes an air intake system 112, a fueling system 116, and one or more cylinders 114. Other components of the engine 110 are omitted from explanation herein.

The intake air may first flow through an air cleaner (not shown in the present figure) disposed upstream of the compressor 122 and structured to purify the intake air. The compressor 122 may compress the cleaned air, thus increasing the temperature and pressure of the air flow. The compressed air may then be aspirated into the air intake system 112 of the engine 110 through an air intake passage. In some embodiments, a charge air cooler (not shown in the present figure) is disposed on the air intake passage and structured to cool the air to increase the air density. In some embodiments, the air intake system 112 includes an air intake manifold, an air intake throttle, and/or an air intake valve structured to control access of the air to the one or more cylinders 114.

The fueling system 116 of the engine 110 is structured to supply fuel to the one or more cylinders 114 from the fuel source 102 (e.g., fuel tank). In some embodiments, the fueling system 116 includes a fuel pump, one or more fuel lines (or a common rail system), and one or more fuel injectors. Fuel may be suctioned from the fuel source 102 by the fuel pump and fed to the common rail system, which distributes fuel to the fuel injectors for each cylinder. Fuel can be pressurized to boot and control the pressure of the fuel delivered to the cylinders. It shall be understood that any suitable connection arrangement with fuel source, injection location, and/or injector type can be used to provide fuel directly and/or indirectly to the cylinders.

The engine 110 may include one or multiple cylinders 114. Each cylinder may include a combustion chamber in which the compressed fuel-air mixture ignites, and a piston structured to move within the combustion chamber to facilitate the combustion process.

Burnt products of the combustion process (i.e., exhaust gas) may be discharged from the engine 110 and expelled into the turbine 124 through the exhaust passage. The turbine 124 is mechanically coupled to the compressor 122 through, for example, a shaft. The turbine, shaft, and compressor form a turbocharger. The exhaust gas discharged from the engine 110 may drive the turbine 124 to rotate, which may in turn drive the compressor to compress the air supplied to the engine 110. The wastegate 126 can enable part of the exhaust gas to bypass the turbine 124. Thereby less exhaust gas energy is available to the turbine 124, less power is transferred to the compressor 122, and the air flow is supplied to the engine 110 at a lower rate. Reducing a rate of the air flow at the same power level lowers the air to fuel ratio in the cylinder, which might result in an increase in the exhaust gas temperature. The wastegate 126 may be an open-close valve, or a full authority valve. In some embodiments, the wastegate 126 is integrated into the turbine 124. In some embodiments, the turbine 124 is a variable geometry turbine (VGT) with an adjustable inlet to control the flow of exhaust gas therethrough.

A combination of bypass flow and turbine flow may enter the aftertreatment system 130 for aftertreatment. The aftertreatment system 130 is structured to transform/reduce the environmentally harmful emissions from the engine 110, including for example, carbon monoxide, $NO_x$, hydrocarbons, and/or soot. In some examples, the aftertreatment system includes catalytic device(s) and particulate filter(s). The catalytic device(s) may include diesel oxidation catalyst (DOC) device, ammonia oxidation (AMOX) catalyst device, selective catalytic reduction (SCR) device, three-way catalyst (TWC), lean NOX trap (LNT), etc. The particulate filter(s) may include diesel particulate filter (DPF), partial flow particulate filter (PFF), etc. In the aftertreatment system 130 that includes the particulate filter(s), active particulate filter regeneration can serve in part as a regeneration event for the catalytic device(s) and particulate filter(s) to remove urea deposits and to desorb hydrocarbons. In some embodiments, the aftertreatment system 130 does not include particulate filter(s) but only catalytic device(s) and there are no active particulate filter regeneration events. An example aftertreatment system without particulate filtration is shown in FIG. 1 for illustration only but not for limitation.

Components in the aftertreatment system can be arranged in any suitable manner. In the aftertreatment system 130 shown in FIG. 1, an oxidation crystal device 132 is disposed upstream of an SCR device 136. A reductant delivery device 134 is disposed between the oxidation crystal device 132 and the SCR device 136. The oxidation crystal device 132 may include, for example, palladium, platinum and/or aluminum oxide which serves as catalysts to oxidize the hydrocarbons and carbon monoxide with oxygen to form carbon dioxide and water.

The SCR device 136 may include a reduction catalyst that facilitates conversion of $NO_x$ to $N_2$ by a reductant. In some embodiments, the SCR device 136 includes a vanadia catalyst. In other embodiments, the SCR device 136 includes zeolite, base metals, and/or any other suitable type of reduction catalyst. The reductant used to convert $NO_x$ to $N_2$ includes, for example, hydrocarbon, ammonia, urea, diesel exhaust fluid (DEF), or any suitable reductant. The reductant may be injected into the exhaust flow path by the reductant delivery device 134 in liquid and/or gaseous form, such as aqueous solutions of urea, ammonia, anhydrous ammonia, or other reductants suitable for SCR operations.

Figure 4:
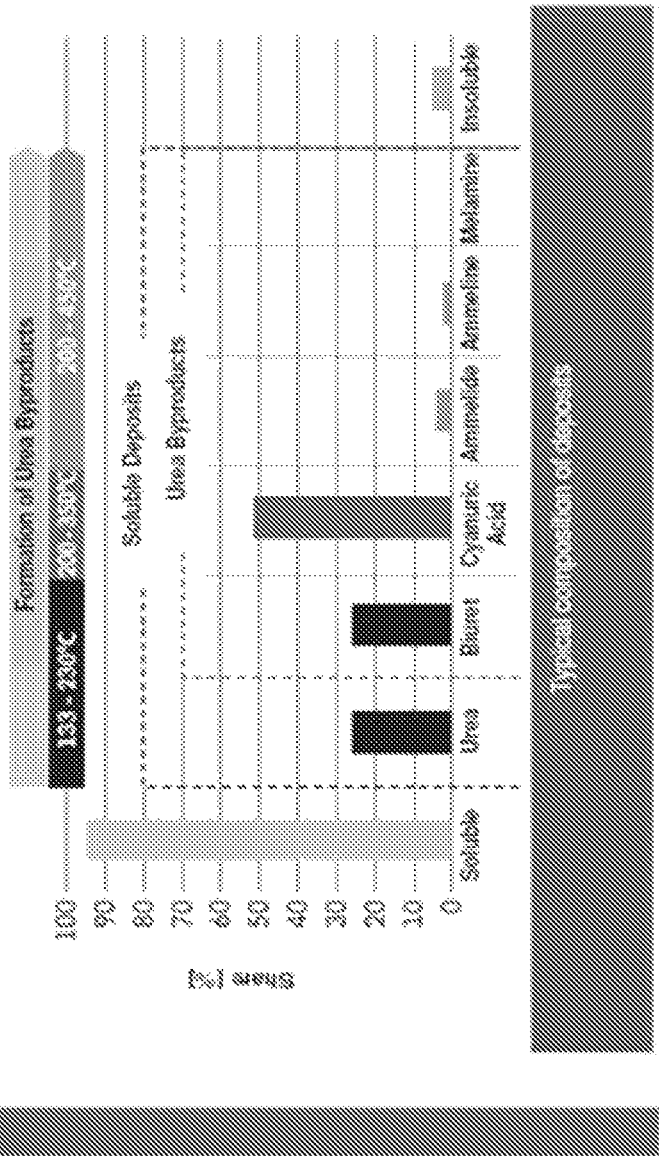
FIG. 4 is a graph showing composition of deposits formed at various temperature ranges, according to an example embodiment.

During operation of the engine 110, deposit may be accumulated on the SCR device 136. An aqueous solution of urea is used as an example reductant. When the temperature of the exhaust gas is higher than the boiling point of the solvent (i.e., water) but lower than the boiling point of the solute (i.e., urea), the solvent would be vaporized from the urea aqueous solution while urea crystal would adhere to the SCR device 136. Various contaminants are formed in various temperature ranges. FIG. 4 shows composition of deposits formed at various temperature ranges, according to an example embodiment. In the temperature range of 133-230° C., the deposits include about 25% of urea and about 25% of Biuret. In the temperature range of 200-350° C., the deposits include about 50% of Cyanuric acid, etc. Deposits of contaminants formed on the SCR device 136 may reduce the contact area of the reaction catalyst and the exhaust stream, thus causing deterioration in the performance of the SCR device 136. Furthermore, excessive deposits in the exhaust path may increase back pressure to the engine and increase fuel consumption. Increased level of deposits may also cause increased ammonia slip from the aftertreatment system.

Figure 2:
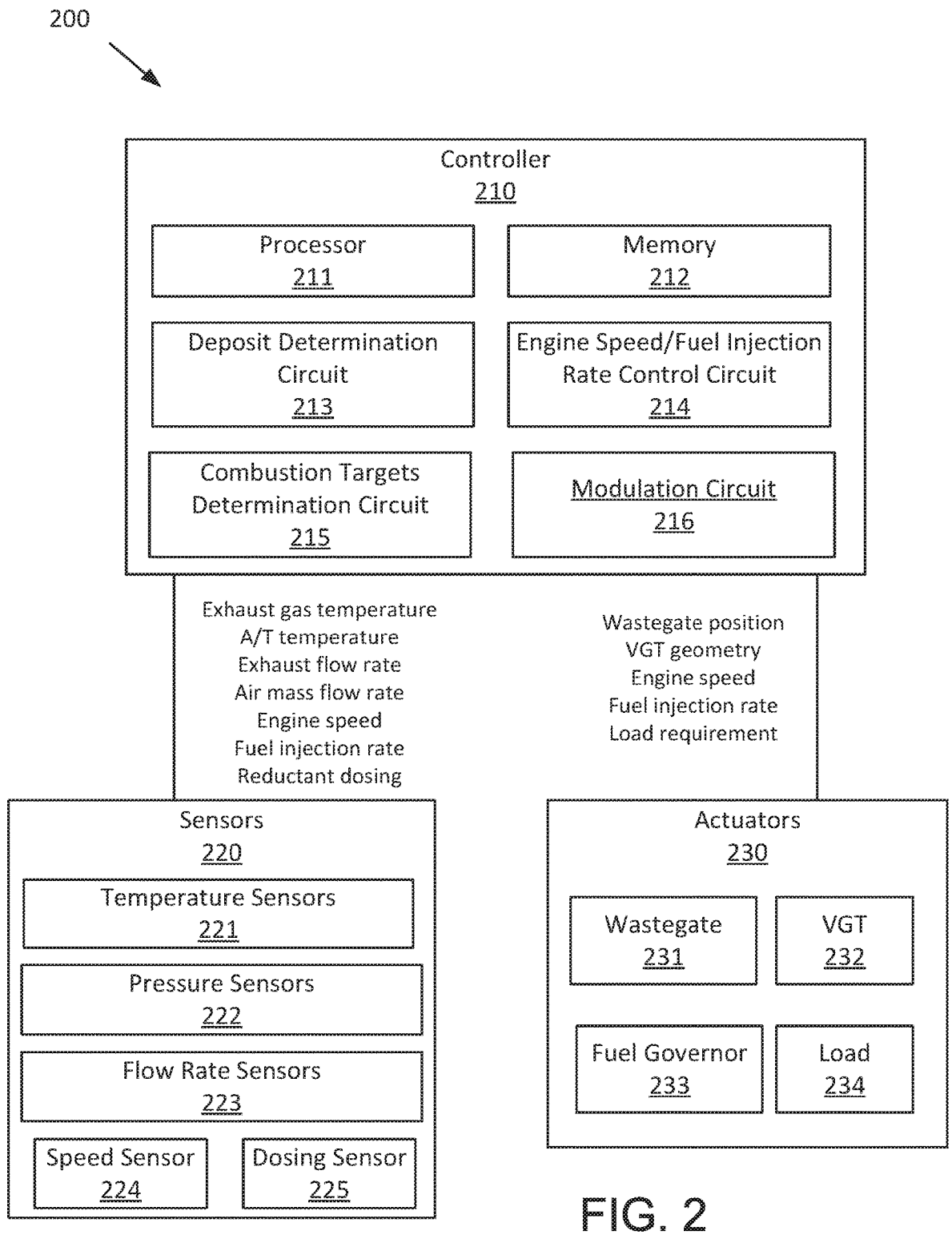
FIG. 2 is a schematic block diagram of a system for removing deposits in an aftertreatment system for an engine, according to an example embodiment.

Referring now to FIG. 2, a schematic block diagram of a system 200 for removing deposit in an aftertreatment system (e.g., the aftertreatment system 130 of FIG. 1) is shown, according to an example embodiment. The system 200 includes a controller 210 communicably coupled to sensors 220 and actuators 230. The sensors 220 can generate data indicative of various operating parameters of the engine application system (e.g., the system 100 of FIG. 1). The controller 210 can receive the data from the sensors 220, process the data to create corresponding commands, and send the commands to the actuators 230. The actuators 230 can actuate various components of the engine according to the commands from the controller 210. Communication between and among the controller 210, the sensors 220, and the actuators 230 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In some embodiments, a CAN bus provides the exchange of signals, information, and/or data. The CAN bus includes any number of wired and wireless connections.

The controller 210 is shown to include a processor 211 and a memory 212. The processor 211 may be implemented as any type of processor including an application specific integrated circuit (ASIC), one or more field programmable gate arrays (FPGAs), a digital signal processor (DSP), a group of processing components, or other suitable electronic processing components. The one or more memory devices 212 (e.g., NVRAM, RAM, ROM, Flash Memory, hard disk storage, etc.) may store data and/or computer code for facilitating the various processes described herein. Thus, the one or more memory devices 212 may be communicably connected to the processor 211 and provide computer code or instructions for executing the processes described in regard to the controller 210 herein. Moreover, the one or more memory devices 212 may be or include tangible, non-transient volatile memory or non-volatile memory. Accordingly, the one or more memory devices 212 may include database components, object code components, script components, or any other type of information structure for supporting the various activities and information structures described herein.

As shown, the controller 210 includes various circuits for completing the activities described herein. In one embodiment, the circuits of the controller 210 may utilize the processor 211 and/or memory 212 to accomplish, perform, or otherwise implement various actions described herein with respect to each particular circuit. In this embodiment, the processor 211 and/or memory 212 may be considered to be shared components across each circuit. In another embodiment, the circuits (or at least one of the circuits) may include their own dedicated processing circuit having a processor and a memory device. In this latter embodiment, the circuit may be structured as an integrated circuit or an otherwise integrated processing component. In yet another embodiment, the activities and functionalities of circuits may be embodied in the memory 212, or combined in multiple circuits, or as a single circuit. In this regard and while various circuits with particular functionality are shown in FIG. 2, it shall be understood that the controller 210 may include any number of circuits for completing the functions and activities described herein. For example, the activities of multiple circuits may be combined as a single circuit, as an additional circuit(s) with additional functionality, etc. Further, it shall be understood that the controller 210 may further control other activity beyond the scope of the present disclosure.

Certain operations of the controller 210 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown, the controller 210 includes a deposit determination circuit 213, an engine speed/fuel injection rate control circuit 214, a combustion targets determination circuit 215, and a modulation circuit 216. Through the circuits 213-216, the controller 210 is structured to determine an amount of deposits accumulated in the aftertreatment system, determine combustion targets for the engine in response to determining the amount of deposits exceeds a deposit threshold, and modulate an air mass flow for the engine based on the determined combustion targets. In some embodiments, the controller 210 is further structured to determine whether an speed of the engine exceeds a speed threshold and/or whether an fuel injection rate of the engine exceeds a fuel injection rate threshold, increase the speed of the engine in response to determining that the speed of the engine does not exceed the speed threshold, and/or increase the fuel injection rate of the engine in response to determining that the fuel injection rate of the engine does not exceed the fuel injection rate threshold.

The deposit determination circuit 213 is structured to determine the amount of deposits (e.g., urea) accumulated in the aftertreatment system (e.g., the SCR device 136 of FIG. 1). In some embodiments, the amount of deposits is determined based on the temperature of the aftertreatment system, the flow rate of the exhaust gas flowing through the aftertreatment system, and the dosing quantity of the reductant injected into the aftertreatment system (e.g., by the reductant delivery device 134 of FIG. 1). For example, the deposit determination circuit 213 may receive data indicative of the dosing quantity (i.e., injection amount per unit time) of the reductant (e.g., urea aqueous solution) from a dosing sensor 225. Alternatively, the deposit determination circuit 213 may calculate the dosing quantity based on the operating condition of the engine. The deposit determination circuit 213 may receive data indicative of the flow rate of the exhaust gas from one of the flow rate sensors 223 and data indicative of the temperature of the aftertreatment system from one of the temperature sensors 221. The amount of reductant that stays in the aftertreatment system (i.e., not being vaporized and discharged) per unit time can be determined based on the dosing quantity and the temperature of the aftertreatment system by, for example, using a look-up table or calculation. The amount of reductant that is consumed in the aftertreatment system (i.e., react with the exhaust gas) per unit time can be determined based on the flow rate of the exhaust gas and the temperature of the aftertreatment system by, for example, using a look-up table or calculation. The difference between the staying reductant per unit time and the consumed reductant per unit time indicates the accumulation rate of the reductant in the aftertreatment system. As discussed above in reference to FIG. 4, the temperature may also affect the composition of the deposits formed. The amount of deposits can be determined based on the accumulation rate and the compositions of the deposits.

In some embodiments, the amount of deposits is determined by the run time of the engine since the last deposits removal event. For example, the deposit determination circuit 213 may include a timer, which can count time whenever the engine speed exceeds a predefined speed (i.e., the engine is deemed to be running).

In some embodiments, the amount of deposits is determined by any suitable methods/measures or any suitable combination thereof. For example, the amount of deposits can be indicated by passage of time since a last deposit removal event, the amount of time that engine has operated under certain operation state, the distance traveled, the amount of reductant injected, the amount of fuel consumed, other operating parameters indicative of deposits accumulation since the last deposits removal event, or any suitable combination thereof.

In further embodiments, the deposit determination circuit 213 may request a deposits removal event in response to determining that the amount of deposits exceeds a predetermined deposit threshold. The deposit threshold indicates a contamination condition of catalyst (e.g., SCR catalyst) in which the performance of the catalyst falls below a desired performance as a result of accumulation of deposits on the catalyst. Various thresholds can be used, such as a threshold amount of reductant accumulated over time, threshold run time of the engine, threshold passage of time, threshold amount of time that engine has operated under certain operation state, threshold distance traveled, threshold amount of reductant injected, threshold amount of fuel assumed, etc., or any suitable combination thereof.

The engine speed/fuel injection rate control circuit 214 is structured to determine, in response to the deposit determination circuit 213 determining that the amount of deposits exceeds the deposit threshold, whether the speed of the engine exceeds a speed threshold and/or whether a fuel injection rate of the engine exceeds a fuel injection rate threshold. The engine speed/fuel injection rate control circuit 214 is further structured to increase the speed of the engine if the speed does not exceed the speed threshold, and/or increase the fuel injection rate if the rate does not exceed the fuel injection rate threshold. The engine speed/fuel injection rate control circuit 214 may receive data indicative of the speed of the engine from a speed sensor 224, and/or data indicative of the fuel injection rate from the fuel system sensors that include fuel rail pressure measurement (e.g., one of the pressure sensors 222) and fuel on time measurements. It shall be understood that any other suitable methods can be used to measure/calculate the speed of the engine and the fuel injection rate. The engine speed/fuel injection rate control circuit 214 may increase a load requirement, and/or command a fuel governor 233 in order to increase the speed of the engine and/or the fuel injection rate. For example, the engine speed/fuel injection rate control circuit 214 can command a higher target engine speed under idle state or shift into a gear that provides higher engine speed under mobile state via the fuel governor 233. The load requirement can be increased by applying additional electrical, mechanical, and/or hydraulic load 234 from the vehicle (e.g., DB grids for locomotives, hydraulic pumps or drives, accessories load, etc.). The additional load may be one of or any combination of the above types of load. Increasing the engine speed/fuel injection rate can prepare the engine application system for further processing of the deposit removal. However, it shall be understood that in some embodiments, increasing the engine speed/fuel injection rate to some thresholds is not required.

The combustion targets determination circuit 215 is structured to determine combustion targets for the engine in response to determining the amount of deposits exceeds the deposit threshold. For example, a temperature range needs to be achieved in order to effectively remove the deposits from the catalyst. In some embodiments, the temperature range is a target temperature of the exhaust gas at a particular position in the aftertreatment system, such as an engine out exhaust temperature or a temperature of the aftertreatment system. In some embodiments, the temperature of the engine out exhaust temperature can be inferred from the temperature of the aftertreatment system, or vice versa. The temperature range for desorbing hydrocarbons on the SCR catalyst is above about 200° C. The temperature range for removing urea deposits on the SCR catalyst is about 400-500° C., or 430-470° C. in some embodiments for the engine out exhaust temperature, which translates to 410-450° C. at the SCR device. Meanwhile, the smoke emission from the aftertreatment system needs to be kept below the level provided by, for example, emissions regulations. In some embodiments, the some emission target may be determined based on the engine speed, fueling, and altitude conditions. Other combustion targets may include the $NO_x$ emission level, the total hydrocarbon (THC) emission level, the air/fuel ratio, the brake specific fuel consumption (BSFC), the turbine inlet temperature (TIT), etc., that may need to be optimized and/or controlled.

The modulation circuit 216 is structured to modulate the air mass flow for the engine based on the combustion targets determined by the combustion targets determination circuit 215. In some embodiments, the modulation circuit 216 modulates the air mass flow by adjusting the position of the wastegate (e.g., wastegate 126 of FIG. 1) via a wastegate actuator 231. As discussed above, the wastegate can enable part of the exhaust gas to bypass the turbine. Thereby less exhaust gas energy is available to the turbine, less power is transferred to the compressor, and the air mass flow is supplied to the engine 110 at a lower rate. In other embodiments, the modulation circuit 216 modulates the air mass flow by adjusting the geometry of turbine (e.g., a VGT) via a VGT actuator 232. The VGT has an adjustable inlet to control the flow of exhaust gas therethrough. The position of the wastegate or the geometry of the VGT can affect the operating parameters of the engine, such as temperature of the aftertreatment system, smoke emission level, $NO_x$ emission level, air/fuel ratio, BSFC, TIT, THC emission level, etc. Therefore, the combustion targets can be achieved by adjusting the position of the wastegate/VGT. It shall be understood that for different engine models, the relationship between the position of wastegate/VGT and the engine operating parameters may vary, which relationship can be determined by experiments and/or simulation calculations.

Figure 5:
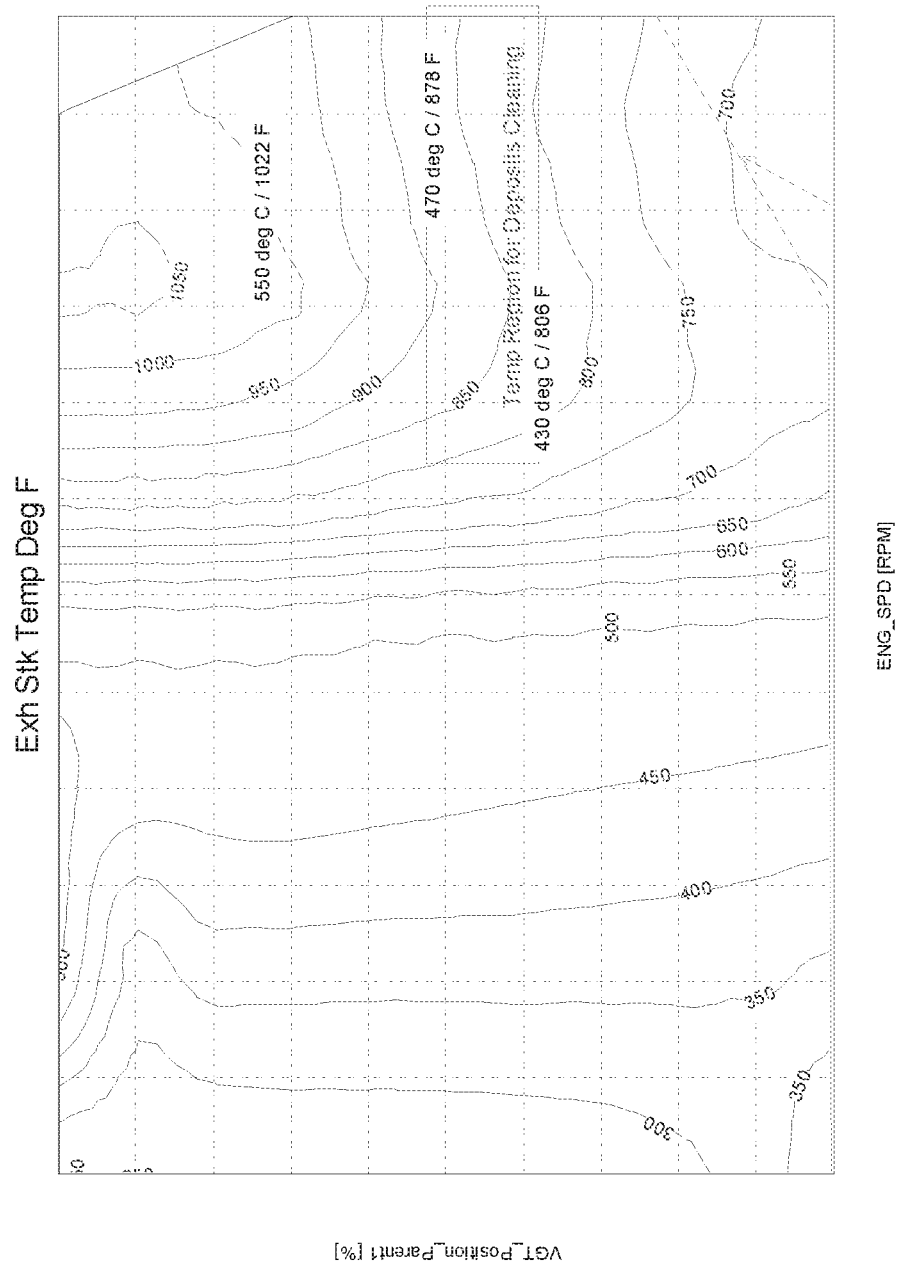
FIG. 5 is a graph showing the temperature of the exhaust gas as a function of the combination of the engine speed and the position of the wastegate/variable geometry turbine (VGT), according to an example embodiment.

FIG. 5 shows the temperature of the engine out exhaust gas as a function of the combination of the engine speed and the position of the wastegate/VGT, according to an example embodiment. In normal operation (i.e., not for deposit removal), the exhaust gas flow that bypasses the turbine via the wastegate/VGT is almost zero for the engine speed lower than 1500 rpm, and increases linearly across the speed range of 1500-1800 rpm and reaches about 25% at the engine speed of 1800 rpm. The exhaust gas temperature during normal operation is in the range of about 380-400° C. FIG. 5 shows that for the engine speed range of about 1300-1800 rpm, the temperature of the exhaust gas increases with the increase of the percentage of the bypassing exhaust gas flow. As discussed above, increasing the bypassing exhaust gas flow results in less power transferred to the compressor and lower air mass flow supplied to the engine. Reducing a rate of fresh air flow at the same power level lowers the air to fuel ratio in the cylinder, which might result in an increase in the exhaust gas temperature. Given the target temperature range for the deposit removal (e.g., 430-470° C. for urea deposit removal), the matching combinations of engine speed and wastegate/VGT position can be identified from FIG. 5. The range of wastegate/VGT position can then be determined when engine speed is known from the speed sensor 224. It shall be understood that the temperature of the exhaust gas can be a function of the combination of the position of wastegate/VGT and another operating parameter of the engine (i.e., not the engine speed), such as fueling condition, engine displacement, etc. The range of wastegate/VGT position can be determined by similar method as discussed above.

Figure 6:
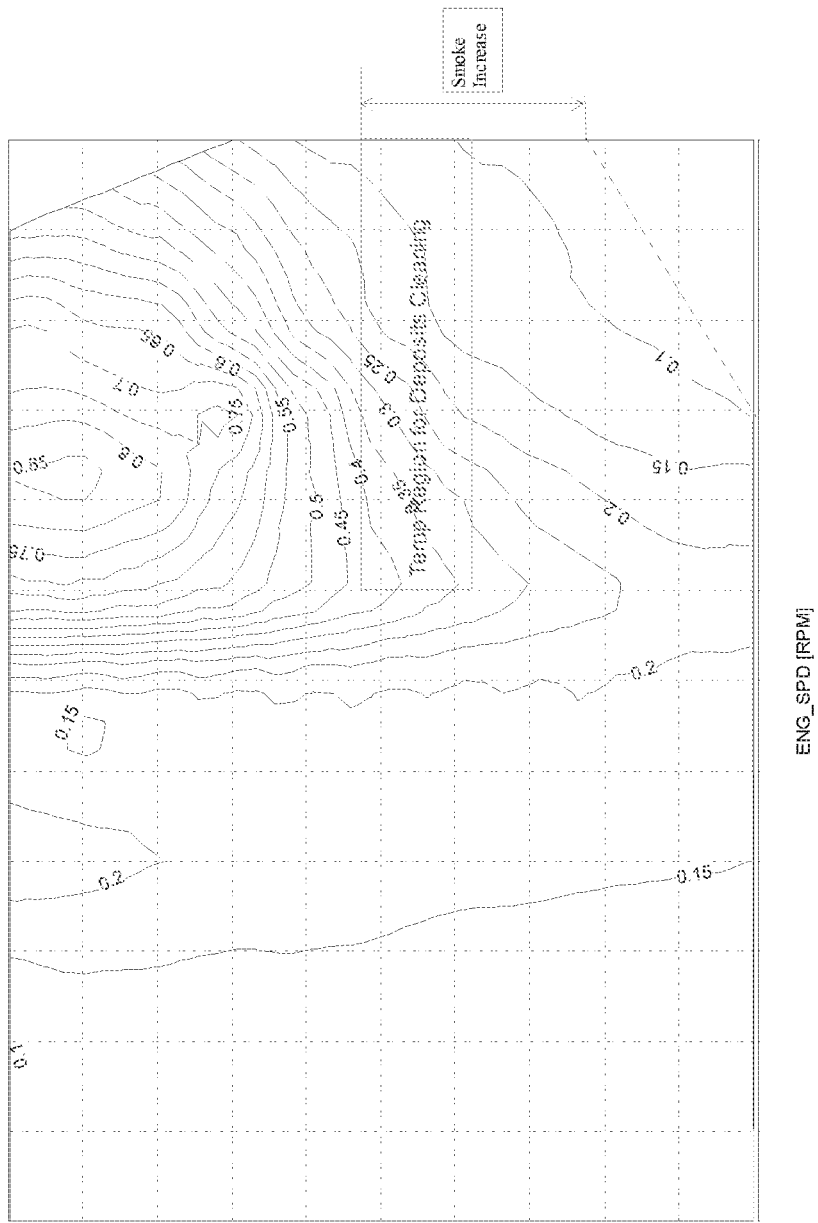
FIG. 6 is a graph showing the smoke emission level as a function of the combination of the engine speed and the position of the wastegate/VGT, according to an example embodiment.

FIG. 6 shows the level of smoke emission as a function of the combination of the engine speed and the position of the wastegate/VGT, according to an example embodiment. As shown, the smoke emission level increases about 80-120% during the deposit removal event comparing to the normal operation. Given the target smoke emission level, the matching combinations of engine speed and wastegate/VGT position can be identified from FIG. 6. The range of wastegate/VGT position can then be determined when the engine speed is known from the speed sensor 224.

Figure 7:
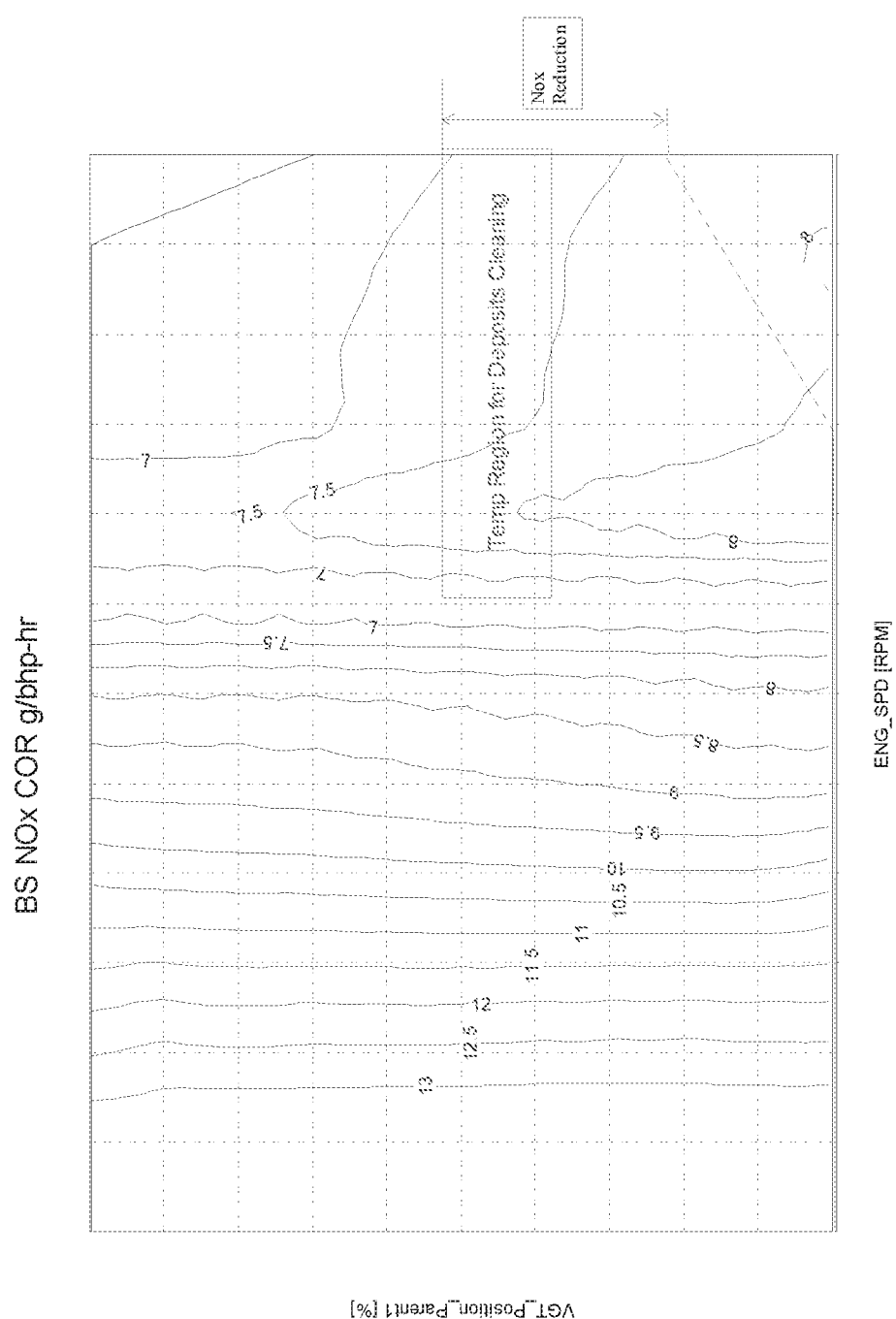
FIG. 7 is a graph showing the nitrogen oxide ($NO_x$) emission level as a function of the combination of the engine speed and the position of the wastegate/VGT, according to an example embodiment.
Figure 8:
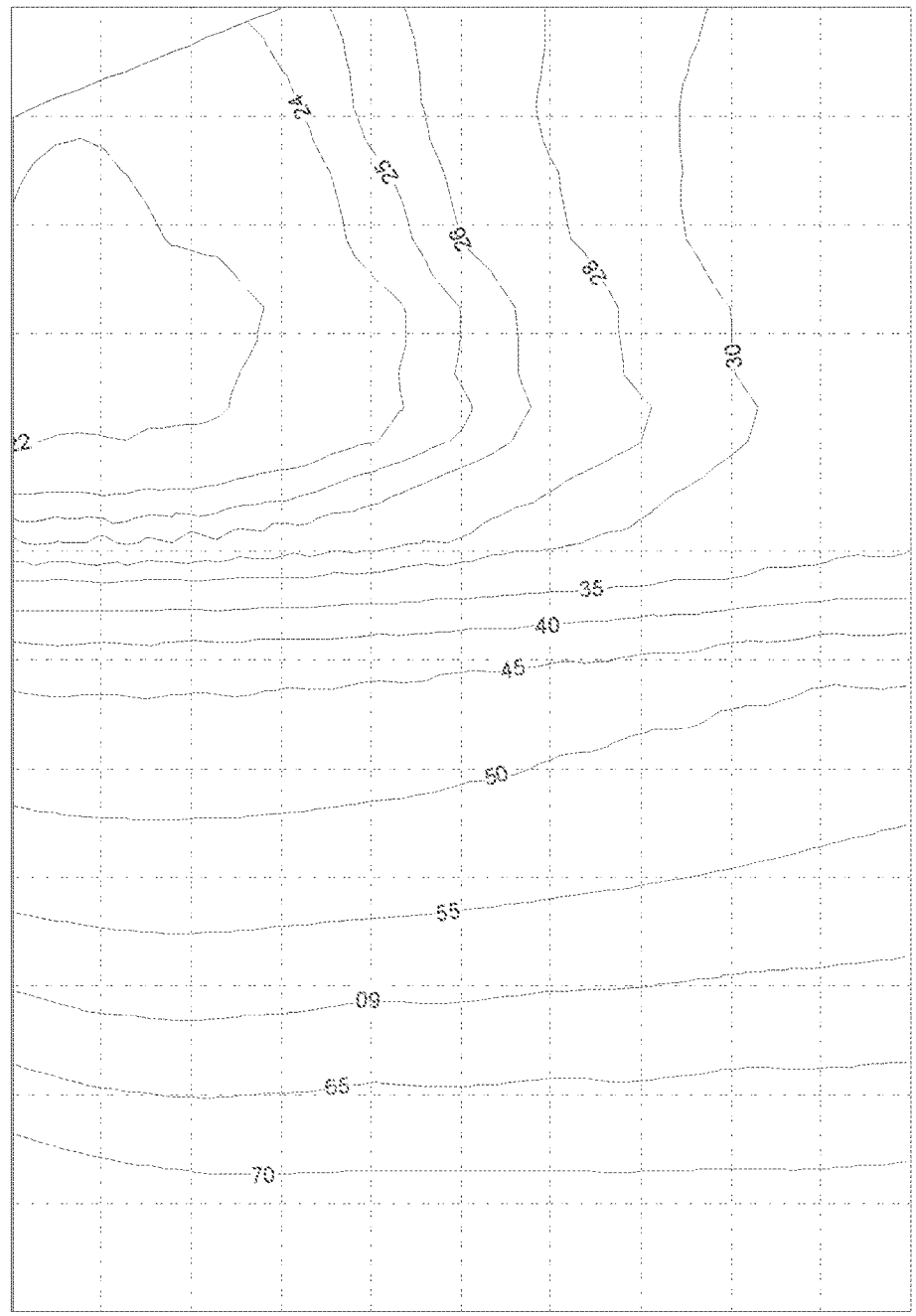
FIG. 8 is a graph showing the air/fuel ratio as a function of the combination of the engine speed and the position of the wastegate/VGT, according to an example embodiment.
Figure 9:
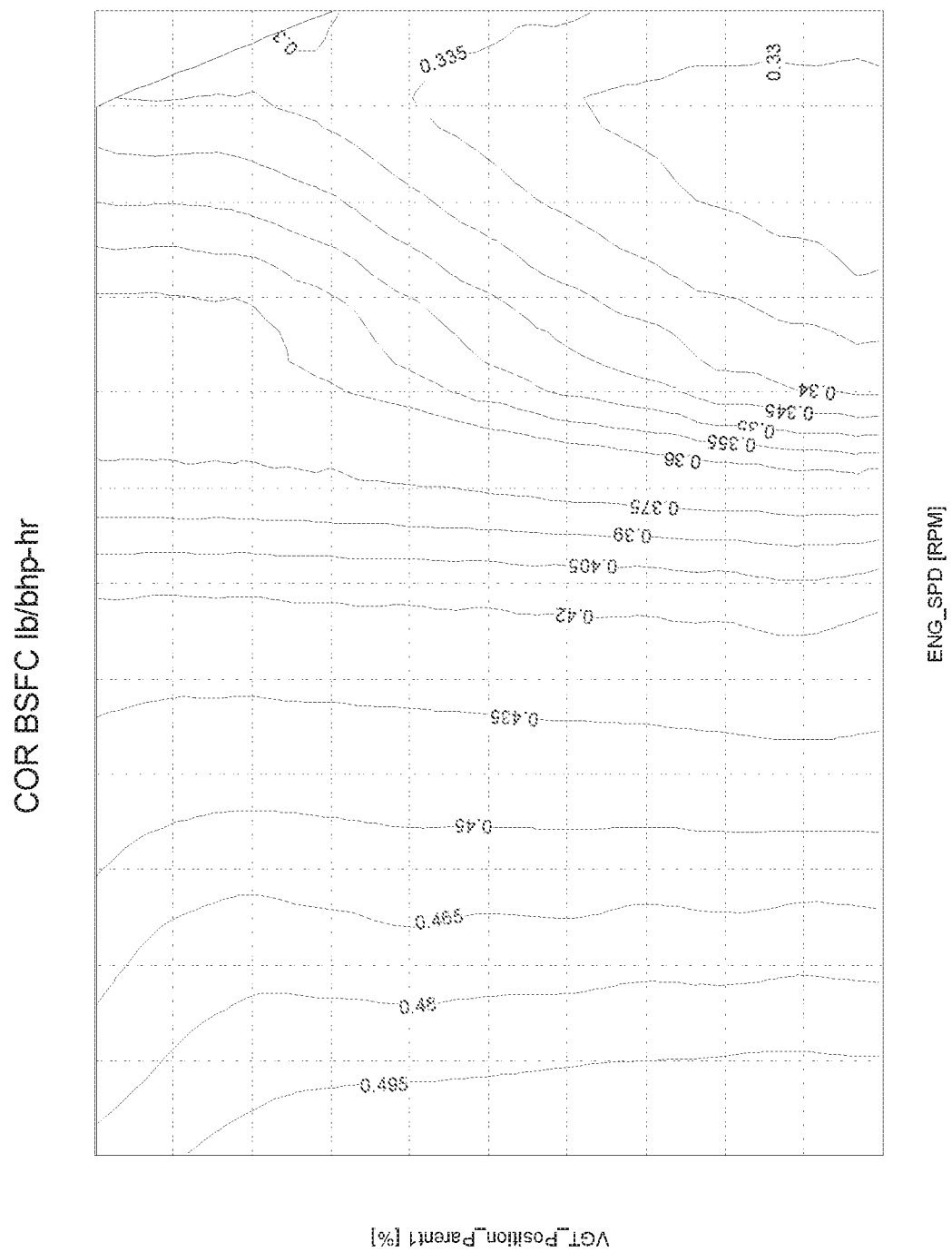
FIG. 9 is a graph showing the brake specific fuel consumption (BSFC) as a function of the combination of the engine speed and the position of the wastegate/VGT, according to an example embodiment.
Figure 10:
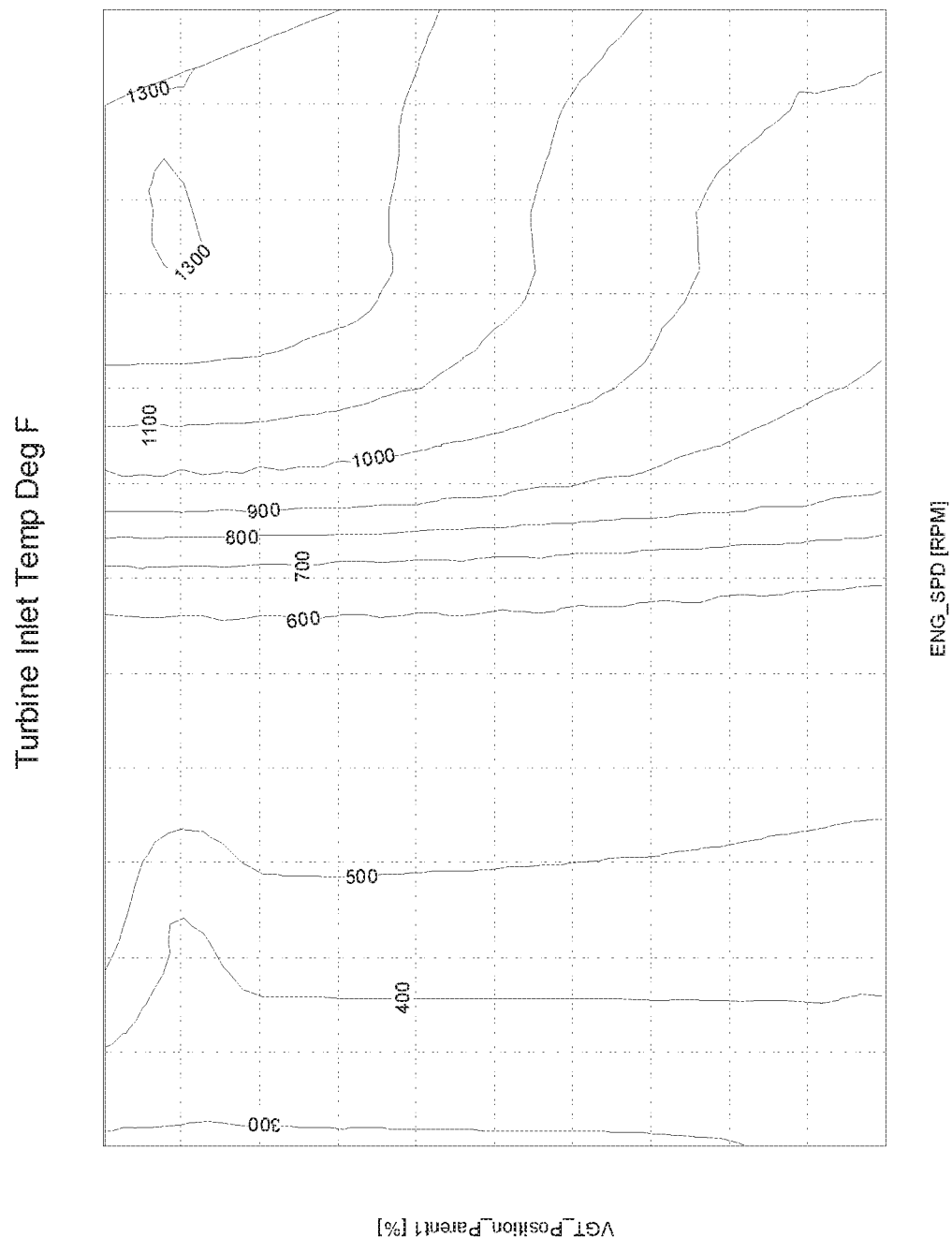
FIG. 10 is a graph showing the turbine inlet temperature (TIT) as a function of the combination of the engine speed and the position of the wastegate/VGT, according to an example embodiment.
Figure 11:
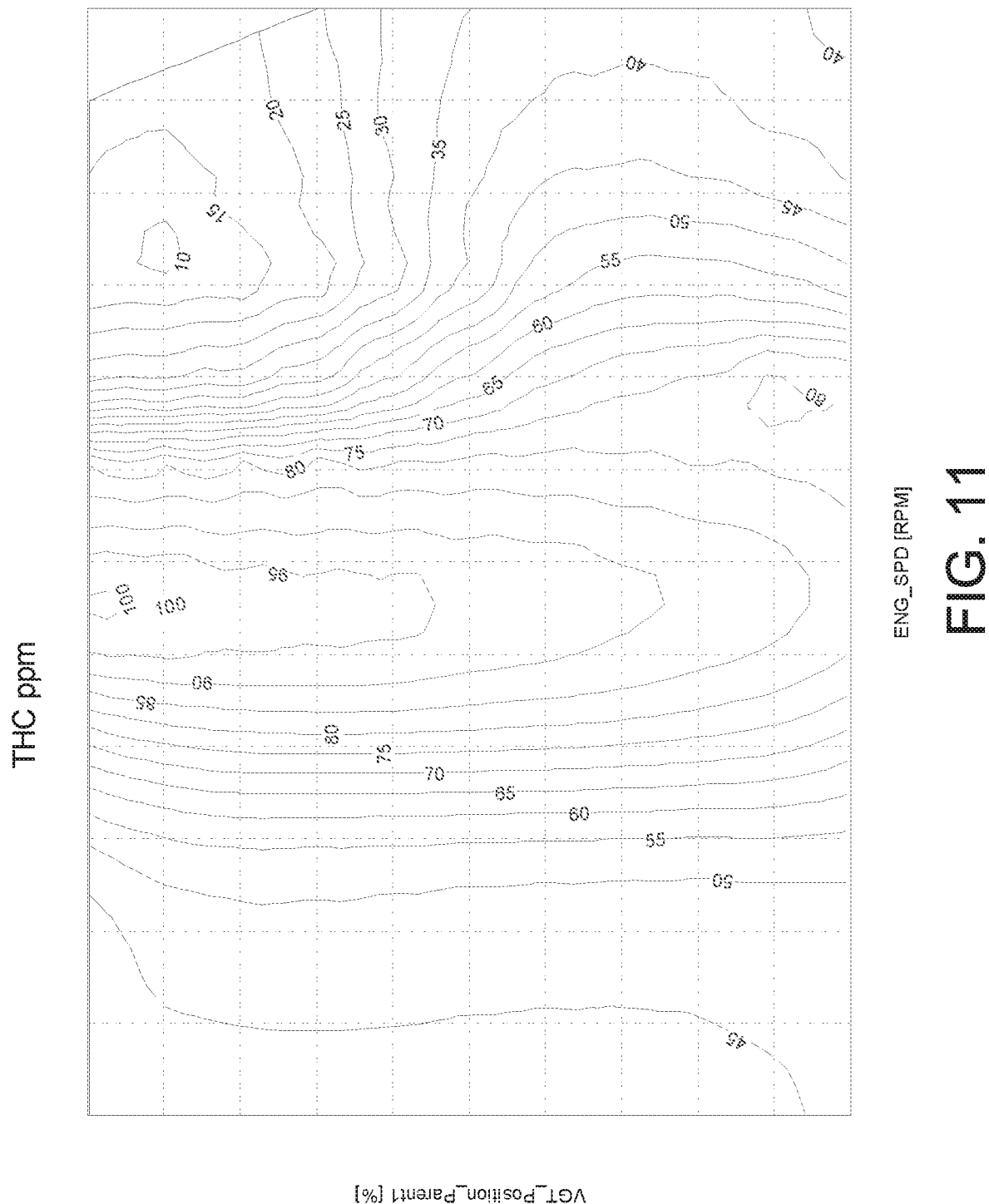
FIG. 11 is a graph showing the total hydrocarbon (THC) emission level as a function of the combination of the engine speed and the position of the wastegate/VGT, according to an example embodiment.

FIG. 7 shows the $NO_x$ emission level as a function of the combination of the engine speed and the position of the wastegate/VGT, according to an example embodiment. As shown, the $NO_x$ emission level reduces up to about 10% during the deposit removal event comparing to the normal operation. FIGS. 8-11 shows the air/fuel ratio, the BSFC, the TIT, and the THC as a function of the combination of the engine speed and the position of the wastegate/VGT, respectively, according to an example embodiment. The range of wastegate/VGT position can be determined for achieving the targets set for these parameters, using the method discussed above with reference to FIGS. 5 and 6.

In some embodiments, the modulation circuit 216 is further structured to implement a feedback control over the air mass flow rate. In particular, the temperature of the aftertreatment system measured by one of the temperature sensors 221 is fed to the modulation circuit 216 and used to achieve the target temperature of the exhaust gas.

Figure 3:
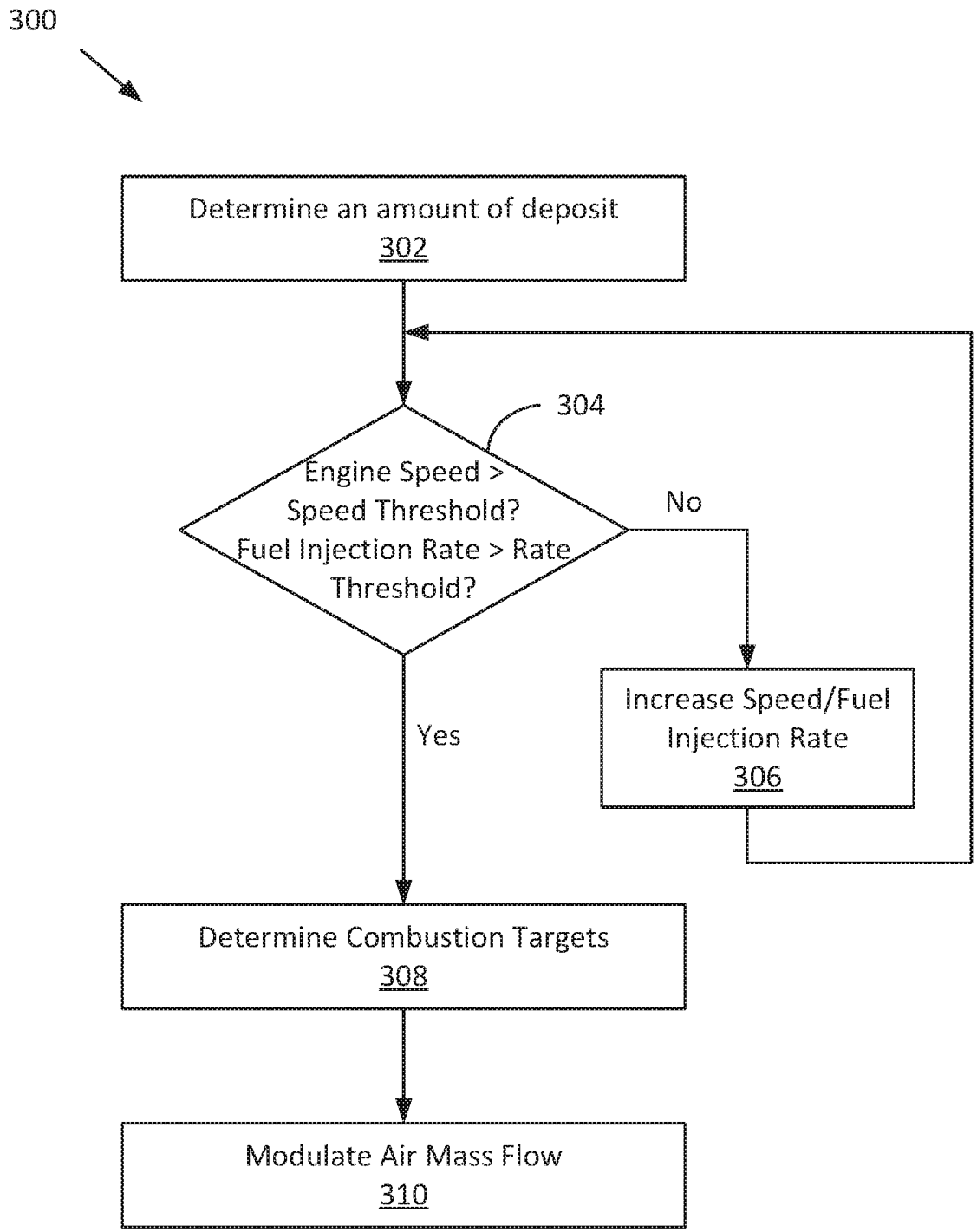
FIG. 3 is a flow diagram of a method for removing deposits in an aftertreatment system for an engine, according to an example embodiment.

Referring now to FIG. 3, a flow diagram of a method 300 for removing deposit in an aftertreatment system for an engine is shown, according to an example embodiment. The method 300 may be implemented with the controller 210 and in the system 100.

At process 302, the amount of deposits (e.g., urea) accumulated in the aftertreatment system (e.g., the SCR device 136 of FIG. 1) is determined. In some embodiments, the amount of deposits is determined based on the temperature of the aftertreatment system, the flow rate of the exhaust gas flowing through the aftertreatment system, and the dosing quantity of the reductant injected into the aftertreatment system (e.g., by the reductant delivery device 134 of FIG. 1). In some embodiments, the amount of deposits is determined by the run time of the engine since the last deposits removal event. In some embodiments, the amount of deposits is determined by any suitable methods/measures, such as passage of time since a last deposits removal event, the amount of time that engine has operated under certain state, a distance traveled, the amount of reductant injected, the amount of fuel assumed, other operating parameters indicative of deposits accumulation since the last deposits removal event, or any suitable combination thereof.

At operation 304, in response to determining that the amount of deposits exceeds the deposit threshold, it is determined whether the speed of the engine exceeds a speed threshold and/or whether a fuel injection rate of the engine exceeds a fuel injection rate threshold. The deposit threshold indicates a contamination condition of catalyst (e.g., SCR catalyst) in which the performance of the catalyst falls below a desired performance as a result of accumulation of deposit on the catalyst. Various thresholds can be used, such as a threshold amount of reductant accumulated over time, threshold run time of the engine, threshold passage of time, threshold amount of time that engine has operated under certain state, threshold distance traveled, threshold amount of reductant injected, threshold amount of fuel assumed, etc. or any suitable combination thereof.

If it is determined at process 304 that the speed does not exceed the speed threshold, and/or the rate does not exceed the fuel injection rate threshold, the method proceeds to process 306, where the speed of the engine and/or the fuel injection rate is increased. In some embodiments, the engine speed/fuel injection rate is increased by applying additional electrical and/or mechanical load from the vehicle (e.g., DB grids for locomotives). In some embodiments, the engine speed/fuel injection rate is increased by commanding a higher target engine speed under idle state or shifting into a gear that provides higher engine speed under mobile state. The process 306 repeats until the engine speed exceeds the speed threshold, and/or the fuel injection rate exceeds the fuel injection rate threshold. Increasing the engine speed/fuel injection rate can prepare the system for further processing of the deposit removal event. However, it shall be understood that in some embodiments, increasing the engine speed/fuel injection rate to some thresholds is not required.

If it is determined at process 304 that the speed exceeds the speed threshold, and/or the rate exceeds the fuel injection rate threshold, the method proceeds to process 308, where combustion targets is determined for the engine. For example, a target temperature range may be achieved in order to effectively remove the deposit from the catalyst. Meanwhile, the smoke emission from the aftertreatment system may be kept below the level provided by, for example, emissions regulations. In some embodiments, the smoke emission target may be determined based on the engine speed, fueling, and altitude conditions. Other combustion targets may include the $NO_x$ emission level, the THC emission level, the air/fuel ratio, the BSFC, the TIT, etc., that may be optimized and/or controlled.

At process 310, the air mass flow for the engine is modulated based on the combustion targets determined at process 308. In some embodiments, the air mass flow is adjusted by adjusting the position of the wastegate (e.g., wastegate 126 of FIG. 1) via a wastegate actuator. In other embodiments, the air mass flow is modulated by adjusting the geometry of turbine (e.g., a VGT) via a VGT actuator. The VGT has an adjustable inlet to control the flow of exhaust gas therethrough. The position of the wastegate or the geometry of the VGT can affect the operation parameters of the engine, such as temperature of the aftertreatment system, smoke emission level, $NO_x$ emission level, air/fuel ratio, BSFC, TIT, THC emission level, etc. Thus, the combustion targets can be achieved by adjusting the position of the wastegate or the geometry of the VGT. It shall be understood that for different engine models, the relationship between the wastegate position/VGT geometry and the engine operating parameters may vary, which relationship can be determined by experiments and/or simulation calculations.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the controller 210 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for removing deposits in an aftertreatment system for an engine, the apparatus comprising at least one processor and a memory storing instructions therein that, when executed by the at least one processor, cause the at least one processor to:
   determine an amount of deposits accumulated in the aftertreatment system;
   determine combustion targets for the engine in response to determining that the amount of deposits exceeds a deposit threshold; and
   modulate an air mass flow for the engine based on the determined combustion targets.

2. The apparatus of claim 1, wherein the instructions further cause the at least one processor to:
   determine, in response to determining that the amount of deposits exceeds the deposit threshold, whether a speed of the engine exceeds a speed threshold; and
   increase the speed of the engine in response to determining that the speed of the engine does not exceed the speed threshold.

3. The apparatus of claim 2, wherein the instructions further cause the at least one processor to:
   determine, in response to determining that the amount of deposits exceeds the deposit threshold, whether a fuel injection rate of the engine exceeds a fuel injection rate threshold; and
   increase the fuel injection rate of the engine in response to determining that the fuel injection rate of the engine does not exceed the fuel injection rate threshold.

4. The apparatus of claim 2, wherein the instructions further cause the at least one processor to increase a load requirement for the engine.

5. The apparatus of claim 4, wherein the load requirement is increased by applying an additional electrical, mechanical, and/or hydraulic load.

6. The apparatus of claim 5, wherein the additional electrical, mechanical, and/or hydraulic load includes at least one of a DB grid for locomotive, a hydraulic pump or drive, or an accessory load for the engine.

7. The apparatus of claim 1, wherein the amount of deposits is determined based on at least one of a temperature of the aftertreatment system, a flow rate of exhaust gas flowing through the aftertreatment system, or a dosing quantity of a reductant in the aftertreatment system.

8. The apparatus of claim 1, wherein the amount of deposits is determined based on a run time of the engine since a last deposits removal event.

9. The apparatus of claim 1, wherein the combustion targets include at least one of a target temperature of the aftertreatment system, a target smoke emission level of the aftertreatment system, a target NOx emission level of the aftertreatment system, a target total hydrocarbon (THC) emission level of the aftertreatment system, a target air/fuel ratio, a target brake specific fuel consumption (BSFC), or a turbine inlet temperature (TIT).

10. The apparatus of claim 1, wherein the at least one processor modulates the air mass flow by adjusting a position of a wastegate coupled to the engine.

11. The apparatus of claim 1, wherein the at least one processor modulates the air mass flow by adjusting a geometry of a variable geometry turbine (VGT) coupled to the engine.

12. The apparatus of claim 1, wherein the deposits include urea deposits accumulated on a selective catalytic reduction (SCR) device of the aftertreatment system.

13. A method for removing deposits in an aftertreatment system for an engine, the method comprising:
   determining, by a controller coupled to the engine and to the aftertreatment system, an amount of deposits accumulated in the aftertreatment system;
   determining, by the controller, combustion targets for the engine in response to determining the amount of deposits exceeds a deposit threshold; and
   modulating, by the controller, an air mass flow for the engine based on the determined combustion targets.

14. The method of claim 13, further comprising:
   determining, by the controller and in response to determining that the amount of deposits exceeds the deposit threshold, whether a speed of the engine exceeds a speed threshold, and whether a fuel injection rate of the engine exceeds a fuel injection rate threshold;
   increasing, by the controller, the speed of the engine in response to determining that the speed of the engine does not exceed the speed threshold; and
   increasing, by the controller, the fuel injection rate of the engine in response to determining that the fuel injection rate of the engine does not exceed the fuel injection rate threshold.

15. The method of claim 14, further comprising increasing, by the controller, a load requirement by applying an additional electrical, mechanical, and/or hydraulic load.

16. The method of claim 15, wherein the additional electrical, mechanical, and/or hydraulic load includes at least one of a DB grid for locomotive, a hydraulic pump or drive , or an accessory load for the engine.

17. The method of claim 13, wherein the combustion targets include at least one of a target temperature of the aftertreatment system, a target smoke emission of the aftertreatment system, a target NOx emission of the aftertreatment system, a target total hydrocarbon (THC) emission of the aftertreatment system, a target air/fuel ratio, a target brake specific fuel consumption (BSFC), or a turbine inlet temperature (TIT).

18. The method of claim 13, wherein the air mass flow is modulated by adjusting, by the controller, a position of a wastegate coupled to the engine.

19. The method of claim 13, wherein the air mass flow is modulated by adjusting, by the controller, an geometry of a variable geometry turbine (VGT) coupled to the engine.

20. The method of claim 13, wherein the deposits include urea accumulated on a selective catalytic reduction (SCR) device of the aftertreatment system.

21. A system comprising:
a controller structured to:
determine an amount of deposits accumulated in an aftertreatment system;
determine combustion targets for the engine in response to determining the amount of deposits exceeds a deposit threshold; and
modulate an air mass flow for the engine based on the determined combustion targets.

22. The system of claim 20, wherein the controller is further structured to:
determine, in response to determining the amount of deposits exceeds the deposit threshold, whether a speed of the engine exceeds a speed threshold, and whether a fuel injection rate of the engine exceeds a fuel injection rate threshold;
increase the speed of the engine in response to determining that the speed of the engine does not exceed the speed threshold; and
increase the fuel injection rate of the engine in response to determining that the fuel injection rate of the engine does not exceed the fuel injection rate threshold.

23. The system of claim 21, wherein the controller is further structured to increase a load requirement by applying an additional electrical, mechanical, and/or hydraulic load.

* * * * *